(12) United States Patent
Helms

(10) Patent No.: US 6,768,606 B2
(45) Date of Patent: Jul. 27, 2004

(54) TRACK POSITION ERROR DETERMINATION

(75) Inventor: Carl A. Helms, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 508 days.

(21) Appl. No.: 09/735,250

(22) Filed: Dec. 12, 2000

(65) Prior Publication Data

US 2002/0097518 A1 Jul. 25, 2002

(51) Int. Cl.$^7$ ................................................. G11B 5/58
(52) U.S. Cl. ....................... 360/77.01; 360/31; 360/75; 360/77.12
(58) Field of Search ............................. 360/31, 75, 76, 360/77.01, 77.12, 77.13, 77.14, 77.15, 317

(56) References Cited

U.S. PATENT DOCUMENTS

| | | | |
|---|---|---|---|
| 5,309,299 A | * | 5/1994 | Crossland et al. ........ 360/77.01 |
| 5,898,533 A | | 4/1999 | Mantey et al. |
| 5,920,439 A | | 7/1999 | Gillingham et al. |
| 5,926,339 A | | 7/1999 | Mantey et al. |
| 5,940,240 A | | 8/1999 | Kupferman |
| 5,946,158 A | | 8/1999 | Nazarian et al. |
| 5,973,869 A | | 10/1999 | Gillingham et al. |
| 5,982,173 A | * | 11/1999 | Hagen ........................ 324/212 |
| 6,002,541 A | | 12/1999 | Belser et al. |
| 6,018,429 A | | 1/2000 | Mantey et al. |
| 6,023,385 A | | 2/2000 | Gillingham et al. |
| 6,064,542 A | | 5/2000 | Shepherd |
| 6,067,205 A | * | 5/2000 | Mathews et al. ......... 360/77.04 |
| 6,075,666 A | | 6/2000 | Gillingham et al. |
| 6,078,461 A | | 6/2000 | Smith et al. |
| 6,091,567 A | | 7/2000 | Cooper et al. |
| 6,198,584 B1 | * | 3/2001 | Codilian et al. .............. 360/48 |
| 6,243,223 B1 | * | 6/2001 | Elliott et al. ............. 360/77.08 |
| 6,369,971 B1 | * | 4/2002 | Everett ..................... 360/77.08 |
| 6,369,974 B1 | * | 4/2002 | Asgari et al. ............ 360/78.14 |
| 6,430,008 B1 | * | 8/2002 | Trabert et al. .............. 360/317 |
| 6,496,329 B2 | * | 12/2002 | Hungerford et al. ........ 360/121 |

OTHER PUBLICATIONS

A.H. Sacks, W. C. Messner, and M. Bodson, "Mr head effects on PES generation: simulation and experiment," IEEE Trans. Magn., vol. 32, p. 1773–1778. May 1996.

R.H. Dee and J.C. Cates, "Crosstrack profiles of thin film MR tape heads using the azimuth displacement method," IEEE Trans. Magn., vol. 32, p. 3464–3466, Sep. 1996.

R.H. Dee , J.C. Cates, and J.M. Schmalhorst, "Advanced multi–track tape head for high performance tape recording application," IEEE Trans. Magn., vol. 35, p. 712–717, Mar. 1999.

(List continued on next page.)

Primary Examiner—David Hudspeth
Assistant Examiner—Jason Olson
(74) Attorney, Agent, or Firm—Brooks Kushman P.C.

(57) ABSTRACT

Nonlinearities in the interaction between a servo read head and a servo track are considered to more accurately determine the position error or offset between the servo read head and the servo track. A position error expression is determined based on a track profile for the servo read head. A servo track signal is generated by reading a servo track with the servo read head. The position error is determined based on the servo track signal and the position error expression.

25 Claims, 5 Drawing Sheets

OTHER PUBLICATIONS

D. Cahalan and K. Chopra, "Effects of MR head track profile characteristics on servo performance," IEEE Trans. Magn., vol. 30. p. 4203–4205, Nov. 1994.

J.A. Bain, W.C. Messner, J.H. Steele II, T.A. Schwarz, W.J. O'Kane, and M.P. Connolly, "Limitations to track following imposed by position error signal SNR using a multi–tapped magnetoresistive servo head," IEEE Trans. Magn., vol. 35, p. 740–745, Mar. 1999.

D.E. Heim, "Micromagnetic effects in the track profile of MR heads," 1989 Digests of the Intermag Conference, Paper AA–5, 1989.

L. Nix, C. Helms, and D. O'Connor, "Micromagnetic Track Profile Asymmetries in Dual Magnetoresistive Heads," IEEE Trans. Magn., vol. 27, p. 4693–4697, Nov. 1991.

E. Katz, "Erase Profiles of Floppy Disk Heads," IEEE Trans. Magn., vol. 20, p. 528–541, Jul. 1984.

J. Lee, A. Wallash, and A. Poon, "Effects of read/write misalignment and asymmetric side reading on magnetoresistive head off–track performance," J. Appl. Phys, vol. 69, p. 5399–5401, Apr. 1991.

A. Wallash, M. Salo, J. Lee, D. Heim, and G. Garfunkel, "Dependence of magnetoresistive head readback characteristics on sensor height," J. Appl. Phys., vol. 69, p. 5402–5404, Apr. 1991.

J.S. Feng, "Gap length and sensor height effects on readback signals inshiekded magnetoresistive sensors," IEEE Trans. Magn., vol. 28, p 1031–1037, Mar. 1992.

N. Smith, Reciprocity principles for magnetoresistive heads, IEEE Trans. Magn., vol. 29, p. 2279–2285, Sep. 1993.

* cited by examiner

TRACK POSITION ERROR DETERMINATION

TECHNICAL FIELD

The present invention relates to determining the position of data storage media relative to an access head through the use of one or more servo tracks.

BACKGROUND ART

Data storage systems including storage media moving relative to an access head are commonly used to store voice and data information due to the reliability, cost efficiency, and ease of use of such storage media. Media types may store information through a variety of means and may be formed in a variety of formats including magnetic tape, magnetic disks, optical tape, optical disks, and the like. Storage media may be made more useful and cost-effective by increasing the areal density of stored information. This has been accomplished by including more data tracks across a given width of the media. While allowing more data to be stored, the increase in the density of data tracks requires a narrowing of the width of the data tracks, a narrowing of the spacing between data tracks, or both. As the data tracks are more closely spaced, positioning of the media with respect to a media access head becomes more critical to reduce the possibility of errors introduced while reading or writing information.

For example, magnetic tape access head assemblies generally include read heads for reading data from the magnetic tape and write heads for writing data to the magnetic tape. Typically, read heads may be formed in a read module with one read head for each data track that is to be simultaneously read. Similarly, write heads are manufactured into a write module, with one write head for each data track to be simultaneously written. Thin film construction techniques are used to achieve the small geometries required to produce read heads and write heads capable of accessing densely packed data tracks. To permit read-after-write operation on tape moving in either tape direction over the tape access head assembly, a typical tape access head assembly may include a sandwich of one write module between two read modules.

In order to accurately position the tape access head assembly relative to the tape, one or more servo stripes or tracks may be used to provide positional reference along the length of the tape. Servo read heads in the tape access head assembly sense tracking patterns on the servo track and produce signals which are received by a control system. The control system moves the tape access head assembly to keep the servo signals at nominal magnitude. The nominal signal occurs when the servo read head is located in a certain position relative to the servo track.

The position of the servo read head relative to the servo track is typically determined from the strength of the servo read signal when the servo read head is accessing a particular portion of the servo track tracking patterns. Generally, the greater the overlap of the servo read head and a field in the tracking pattern being read, the greater the magnitude of the servo read signal. Present systems assume a linear relationship between changes in the strength of the servo read signal and corresponding changes in the percentage overlap between the servo read head and the read field. However, this assumption typically does not hold for all detectable output from the servo read head. One source of nonlinearity may by caused by read signal sensitivity effects near the edges of the servo read head. Another source of nonlinearity results from an inability to write field patterns that generate an abrupt on-off edge. Hence, what is needed is to more accurately interpret servo read head signals to determine the position error of a servo read head relative to a servo track. This results in a more accurate placement of an access head assembly relative to the media being accessed.

DISCLOSURE OF INVENTION

The present invention compensates for nonlinearities in the interaction between a servo read head and a servo track to more accurately determine the offset between the servo read head and the servo track.

A method is provided for positioning a module having at least one servo read head across media having at least one servo track. A track profile of the servo head is determined. A position error expression is determined based on the track profile. A servo track signal is generated by reading a servo track with the servo read head. A tracking error is determined based on the servo track signal and the position error expression. The module is positioned to correct the tracking error.

In an embodiment of the present invention, the track profile is determined from measurements of the servo read head taken after the module is constructed.

In another embodiment of the present invention, the position error expression is determined by assuming the servo read head track profile is trapezoidal.

In still another embodiment of the present invention, the servo track includes a checkerboard pattern with a background written at a first frequency and erase fields written at a second frequency.

In yet another embodiment of the present invention, the position error expression, PE(z), is expressed as $$PE(z) = w \frac{S(z - z_0 - w) - S(z - z_0 + w)}{S(z - z_0 - w) + S(z - z_0 + w)}$$

where S(z) is a crosstrack profile based on the servo read head track profile, w is a constant based on the width of the servo track pattern, and $z_0$ is a measure of servo error. The measure of servo error may include errors in the servo track pattern, errors in head alignment, and the like. The crosstrack profile may be found by convolving the servo read head track profile with a servo track write profile.

A method of determining the position of an access module relative to a servo track is also provided. The servo track is read by a servo read head on the module. The servo read head generates a read signal based on a portion of a track pattern covered by the servo read head. The module position is determined based on a model of a crosstrack profile formed by varying overlap of a track profile for the servo read head and a track profile for the track pattern.

In an embodiment of the present invention, the model of the crosstrack profile is a phenomenological model. The phenomenological model of the crosstrack profile may be the convolution of the servo read head track profile and the track pattern track profile.

A system for positioning an access module relative to data storage media having at least one servo track is also provided. A servo read head, fixed to the access module, generates a read signal in response to patterns read from a servo track. A module positioning servo positions the module relative to the media based on a module control signal. Memory holds coefficients of a crosstrack profile based on a track profile for the servo read head. Control logic receives the read signal, calculates a position error based on the received read signal and the coefficients, and generates the module control signal to reduce the position error.

The above objects and other objects, features, and advantages of the present invention are readily apparent from the following detailed description of the best mode for carrying out the invention when taken in connect with the accompanying drawings.

BEST MODE FOR CARRYING OUT THE INVENTION

Figure 1:
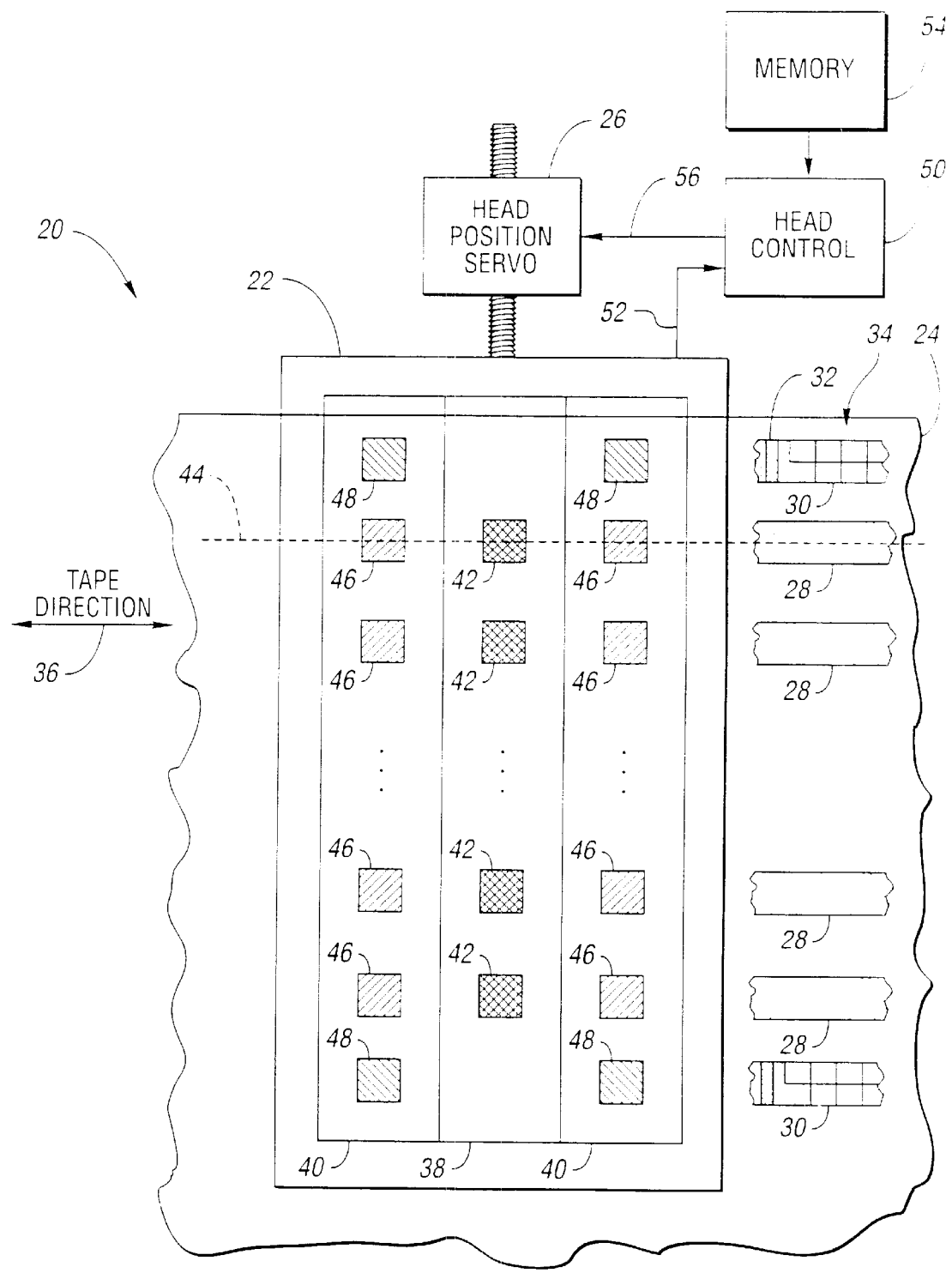
FIG. 1 is a block diagram illustrating a media positioning system according to an embodiment of the present invention.

Referring to FIG. 1, a block diagram illustrating a media positioning system according to an embodiment of the present invention is shown. A tape deck, shown generally by 20, includes tape access head assembly 22 for accessing magnetic tape 24. Tape access head assembly 22 is positioned relative to tape 24 by head positioning servo 26.

Tape 24 includes a plurality of data tracks 28 spaced across the width of tape 24. Tape 24 also includes one or more servo tracks 30 written along the length of tape 24. Each servo track 30 may include periodically spaced features such as synchronization field 32 and servo tracking pattern 34. Tape 24 travels across tape access head assembly 22 in either tape direction 36. Only a portion of each data track 28 and servo track 30 are shown and only an outline for a portion of tape 24 is provided to permit the details of tape head 22 to be seen.

Tape access head assembly 22 includes write module 38 between two read modules 40 to form a read-write-read head. Write module 38 includes a plurality of data write heads 42. Each write head 42 forms a magnetic circuit which induces field patterns on data track 28 lying along data track centerline 44 as tape 24 moves past a gap in write head 42. Read module 40 is manufactured to have a plurality of data read elements 46 and one or more servo read heads 48. Data read heads 46 and servo read heads 48 senses field patterns written onto data tracks 28 and servo tracks 30, respectively, by detecting changes in inductance or magnetoresistance induced by the field patterns.

Servo read head 48 is positioned to read servo tracking pattern 34 on servo track 30. Head control 50 receives servo read signals 52 from each servo read head 48 reading servo tracking patterns 34. Head control 50 determines the offset of tape 24 relative to tape access head assembly 22 in the direction normal to tape direction 36 based on read signals 52 and on coefficients stored in memory 54. Head control 50 generates module control signal 56 causing head position servo 26 to move tape access head assembly 22 relative to tape 24 until servo track 30 is centered across servo read head 50. This centers data track 28 across write heads 42 and data read heads 46 aligned with data track access 44.

Head position servo 26 provides a means for positioning tape head 22 across the width of tape 24. Head position servo 26 may include an electric actuator, a hydraulic actuator, a pneumatic actuator, a magnetic actuator, or the like. Force may be transferred through a variety of transmission systems including gear trains, screws, levers, cabling, belts, and the like. In a preferred embodiment, a voice coil motor is used to position tape access head assembly 22. While moving a tape access head assembly across a tape has been described, it is under by one of ordinary skill in the art that any means to position access head 22 relative to media 24 falls within the spirit and scope of the present invention.

Figure 2:
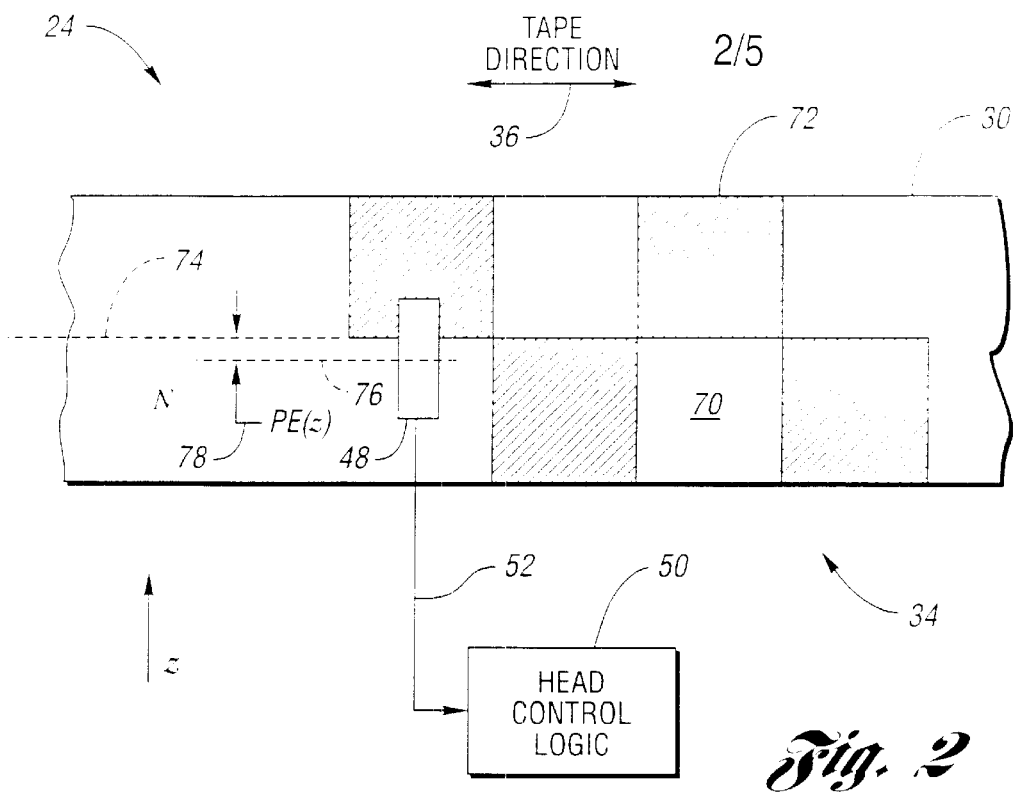
FIG. 2 is a block diagram illustrating position error that may be compensated by the present invention.

Referring now to FIG. 2, a block diagram illustrating position error that may be compensated by the present invention is shown. Many tracking patterns 34 are known in the art of magnetic tape recording. One technique is to form a checkerboard pattern with a background 70 at a first frequency and erase portions at a second frequency to create erase fields 72. Erase fields 72 may be arranged within servo track 30 to form a checkerboard pattern centered on servo pattern centerline 74. Servo read head 48 generates read signal 52 indicating either the strength of background 70 or erase field 72 passing under servo read head 48. If servo track 30 is centered under servo read head 48, as would occur if servo pattern centerline 74 was colinear with servo read head centerline 76, the strength of read signal 52 would remain the same as servo read head 48 moved across tracking pattern 34. If tape 24 is shifted relative to access head assembly 22 by position error 78, the relative strength of read signal 52 over a first portion of tracking pattern 34 would be different than the strength of read signal 52 over an opposite pattern section of pattern 34. By comparing the relative strengths, the offset of servo track 30 relative to servo read head 48 can be determined.

Previous to the present invention, head control logic 50 based control decisions on the assumption that the amplitude of read signal 52 was always linearly proportionate to the percentage that servo read head 48 overlapped background 70 or erase field 72. This assumption is not always accurate. Accuracy is particularly poor when read element 48 is near but not overlapping read field 70, 72 or when servo read head 48 is barely overlapping read field 70, 72. Under such conditions, magnetic fringing in field 70, 72 and the read profile of servo read head 48 create a non-linear relationship in position error 78 relative to the strength of read signal 52.

Figure 3:
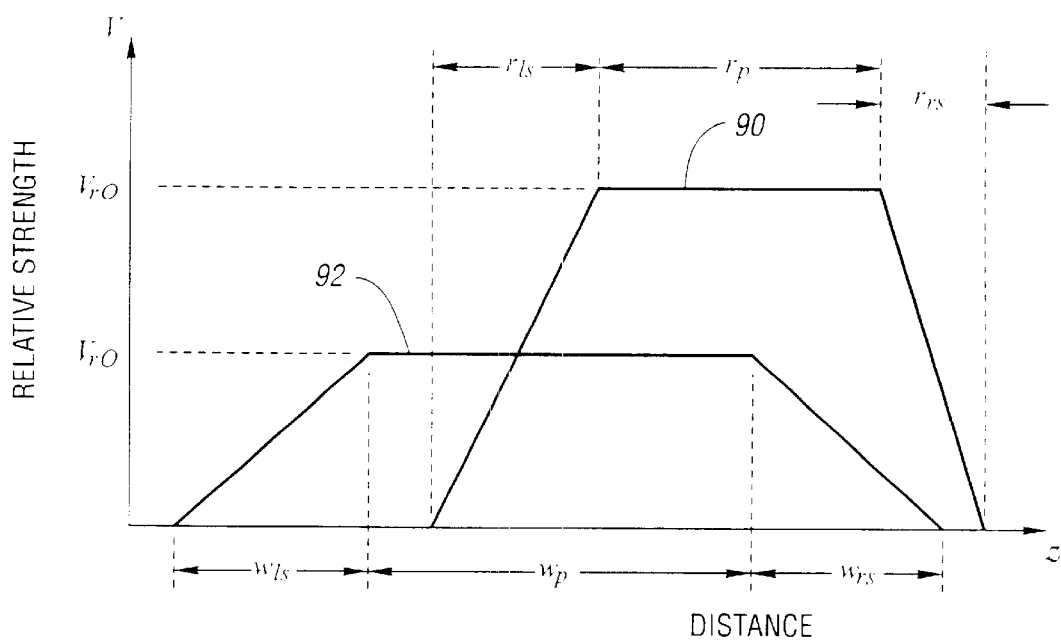
FIG. 3 is a graph illustrating servo read head and servo write track profiles according to an embodiment of the present invention.

Referring now to FIG. 3, graphs illustrating servo read head and servo write track profiles according to an embodiment of the present invention are shown. Servo read head track profile 90 and servo write track profile 92 are plotted as relative signal strength as a function of distance in a direction normal to tape direction 36. Servo read head track profile 90 is modeled by a flat region having a width $r_p$ and a read sensitivity $V_{r0}$, a left skirt region $r_{ls}$ tapering to zero, and a right skirt region $r_{rs}$ tapering to zero. The flat region may correspond roughly to the width of a transducing region in servo read head 48 such as the distance across one or more piezoresistive or magnetoresistive read elements, the width of an inductive gap, or the window width for an optical sensor. The skirt regions may then represent the sensitivity of servo read head 48 in the regions just beyond the sensing element. Likewise, servo write track profile 92 has a flat portion with a width $w_p$ and a signal strength of $V_{w0}$, a left skirt region $w_{ls}$ tapering to zero, and a right skirt region $w_{rs}$ tapering to zero. The flat region generally corresponds to the intended width of field patterns 70, 72, such as magnetically coupling fields, optically reflecting dents or pits, and the like. The skirt regions indicated by $w_{ls}$ and $w_{rs}$ then represent fringing away from the desired pattern. Both servo read head track profile 90 and servo write track profile 92 are illustrated as having straight line skirt regions. Hence, each track profile 90, 92 is substantially trapezoidal in shape. However, it will be understood by one of ordinary skill in the art that the precise shapes for servo read head track profile 90 and servo write track profile 92 will depend upon a variety of factors including media type, field patterns, servo read head construction, and the like.

A crosstrack profile results from the output of servo read head 48 based on the position of servo read head 48 relative to servo track 30. The crosstrack profile indicates the relative strength of read signal 52 as a function of the overlap distance of servo read head 48 with a particular field 70, 72. The relative amplitude of the crosstrack profile may be represented by the area of overlap between servo read head track profile 90 and servo write track profile 92. Mathematically, this can be expressed as the convolution of servo read head track profile 90 with servo write track profile 92 as in Equation 1:

$$S(z) = K \int_{-\infty}^{\infty} W(x, w_p, w_{ls}, w_{rs}) R(z - x, r_p, r_{ls}, r_{rs}) dx \quad (1)$$

where W( ) is an expression for servo write track profile 92, R( ) is an expression for servo read head track profile 90, and K is a constant. Since S(z) has the form of a convolution integral, the Fourier Convolution Theorem may be used to obtain an alternate form as in Equation 2:

$$S(z) = K \int_{-\infty}^{\infty} e^{-ikz} F(k; W) F(k; R) dk \quad (2)$$

where F(k;W) is the Fourier transform of servo write track profile 92 and F(k;R) is the Fourier transform of servo read head track profile 90.

For a trapezoidal servo read head track profile 90 with unit amplitude, the Fourier transform may be expressed as in Equation 3:

$$F(k;R) = i(k\sqrt{2\pi})^{-1}[\Psi(k,r_{ls}) - \Psi(-k,r_{rs})] \quad (3)$$

where $$\Psi(k, \Delta r) = e^{(-\frac{1}{2}ik[r_p + \Delta r])} \operatorname{sinc}\left(\frac{1}{2} k \Delta r\right)$$

and $$\operatorname{sinc}(x) \equiv \frac{\sin(x)}{x}$$

Thus, the integrand of Equation 2 may be transformed into a finite sum of terms, each of which is a ratio of a product of sine and cosine functions with arguments linear in k and divided by $k^4$. The crosstrack profile is then expressed by Equations 4–6 as follows:

$$S(z) = \frac{1}{12} K V_{w0} V_{r0} \sum_{\mu,\nu=0}^{1} (-1)^{\mu+\nu+1} \Theta(w_\mu, r_\nu), \quad (4)$$

$$\Theta(w_\mu, r_\nu) = (w_\mu r_\nu)^{-1} \sum_{m,n=0}^{1} (-1)^{m+n} |Z_{\mu\nu}^{mn}|^3, \quad (5)$$

and $$Z_{\mu\nu}^{mn} = \quad (6)$$
$$z + (-1)^\mu \left(\frac{1}{2} w_p + w'_{1-\mu}\right) - (-1)^\nu \left(\frac{1}{2} r_p + r'_{1-\nu}\right) + (-1)^m w'_\mu - (-1)^n r'_\mu$$

where indices $\mu$, $\nu$, m, and n have values 0 or 1, $w'_0 = w_{ls}/2$, $w'_1 = w_{rs}/2$, $r'_0 = r_{ls}/2$, and $r'_1 = r_{rs}/2$.

Figure 4:
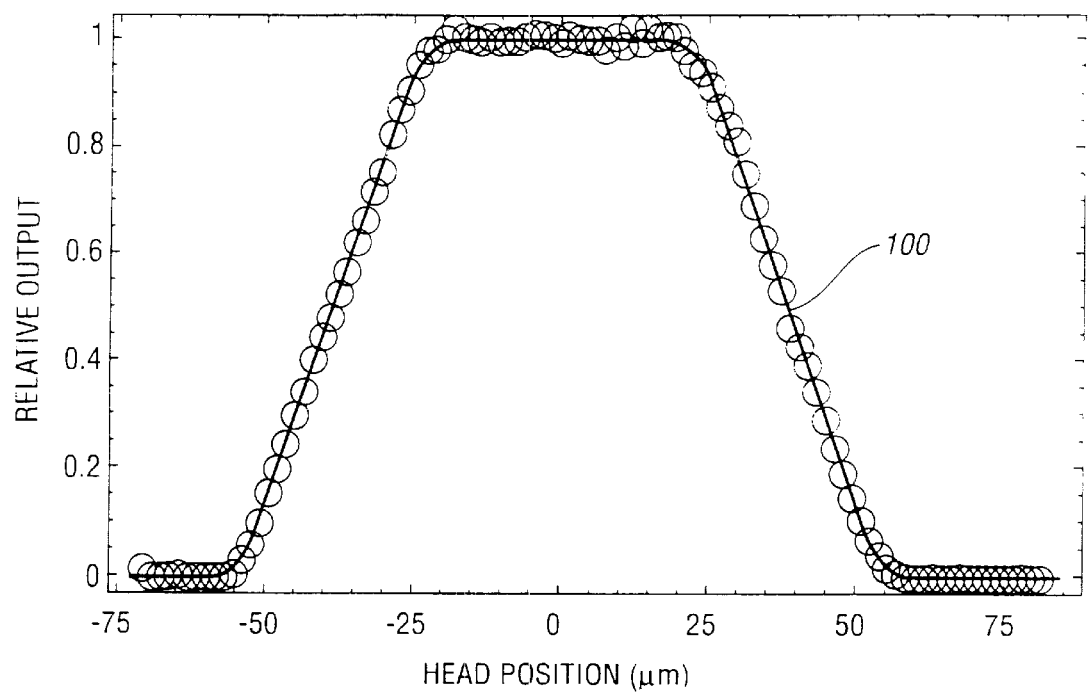
FIG. 4 are graphs illustrating phenomenological and measured crosstrack profiles according to an embodiment of the present invention.

Referring now to FIG. 4, graphs illustrating phenomenological and measured crosstrack profiles according to an embodiment of the present invention are shown. Open circles represent measured values of a crosstrack profile. The data was taken using an unstabilized dual-stripe magnetoresistive head reading a wide written track. Phenomenological crosstrack profile 100 was obtained using Equations 4–6 with fit parameters $w_p = 77.2$ μm, $r_p = 21.3$ μm, $r_{ls} = 9.41$ μm, and $r_{rs} = 9.40$ μm. The skirt widths of servo write track profile 92 were assumed to be zero. Phenomenological crosstrack profile 100 closely follows the measured output of servo read head 48.

Referring as well now to FIG. 2, a formula for expressing position error 78 is shown by Equation 7:

$$PE(z) = \frac{w_t}{2} \frac{S\left(z - \frac{w_t}{2}\right) - S\left(z + \frac{w_t}{2}\right)}{S\left(z - \frac{w_t}{2}\right) + S\left(z + \frac{w_t}{2}\right)} \quad (7)$$

where $w_t$ may be the sum of $w_p$, $w_{ls}$ and $w_{rs}$.

Figure 5:
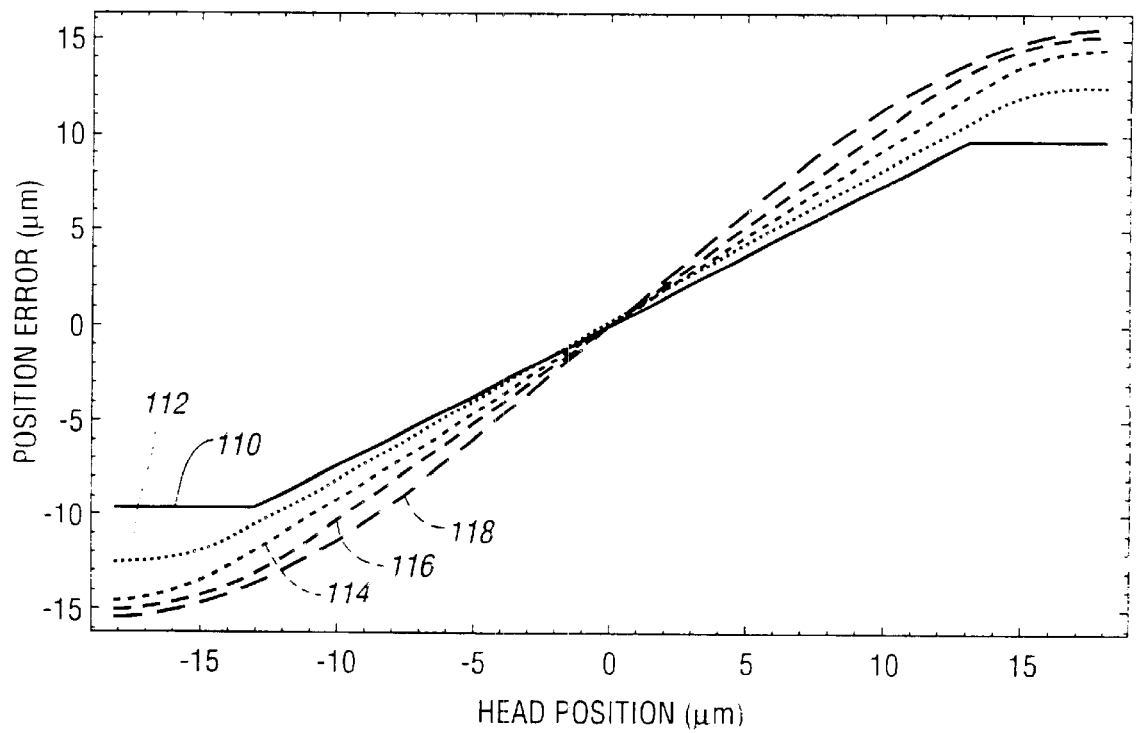
FIG. 5 are graphs of position error as a function of read head position for various read skirt widths according to an embodiment of the present invention.

Referring now to FIG. 5, graphs of position error as a function of read head position for various read skirt widths according to an embodiment of the present invention are shown. FIG. 5 represents plots of Equation 7 where servo write track profile 92 has a width of 36 μm and zero skirt widths, and servo read head track profile 90 has a total width of 43 μm. Each graph 110, 112, 114, 116, 118 plots position error 78 as a function of servo read head centerline 76 relative to servo pattern centerline 74. Curve 110 results from servo read head track profile 90 having zero skirt widths. Graphs 112, 114, 116, 118 result from servo read head track profile 90 having left and right skirt widths of 4.5 μm, 9.0 μm, 13.5 μm and 18.0 μm, respectively. As can be readily observed, increasing the skirt widths for a fixed width servo read head track profile 90 has significant impact on position error 78 for a given read head position. In practice, read signal 52 is interpreted to determine an indication of position error 78. By ignoring non-linearities in servo read head track profile 90, a significant miscalculation of the position of servo read head 48 relative to servo track 30 may result.

Figure 6:
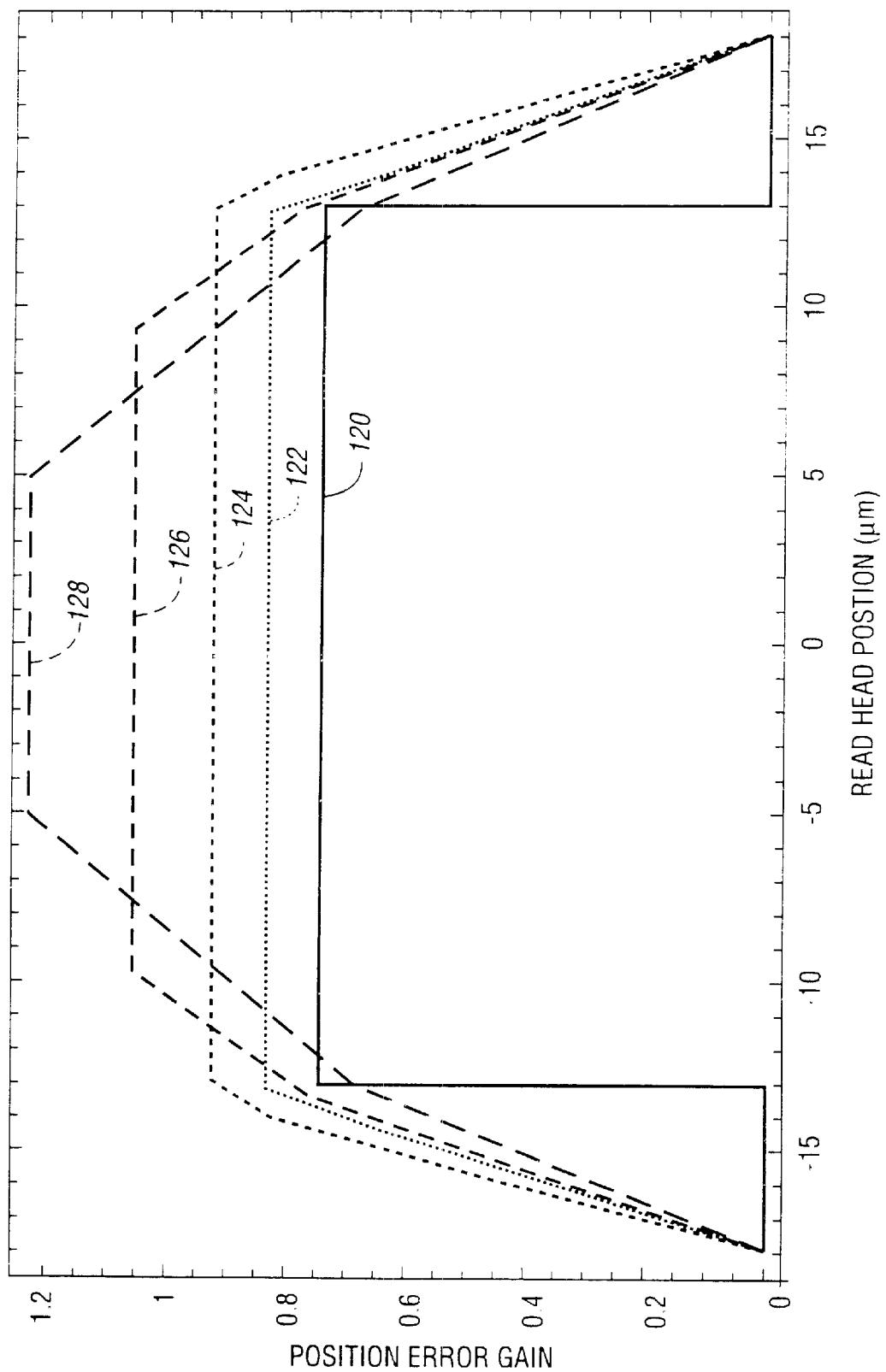
FIG. 6 are graphs of position error gain as a function of read position for various read skirt widths according to an embodiment of the present invention.

Referring now to FIG. 6, graphs of position error gain as a function of read position for various read skirt widths according to an embodiment of the present invention are shown. Graphs 120, 122, 124, 126, 128 plot the slopes of graphs 110, 112, 114, 116, 118, respectively, of FIG. 5. The flat portion of each graph 120, 122, 124, 126, 128 in FIG. 6 represents the effective linear portion of the overlap between servo read head 48 and field 70, 72. As areal density increases, the relative skirt width for servo read head track profile 90 is likely to grow. Hence, without the present invention, the effective dynamic range for read signal 52 decreases. By using crosstrack profile 100 in determining read head position, the present invention achieves greater accuracy over a wider range of position errors 78.

Figure 7:
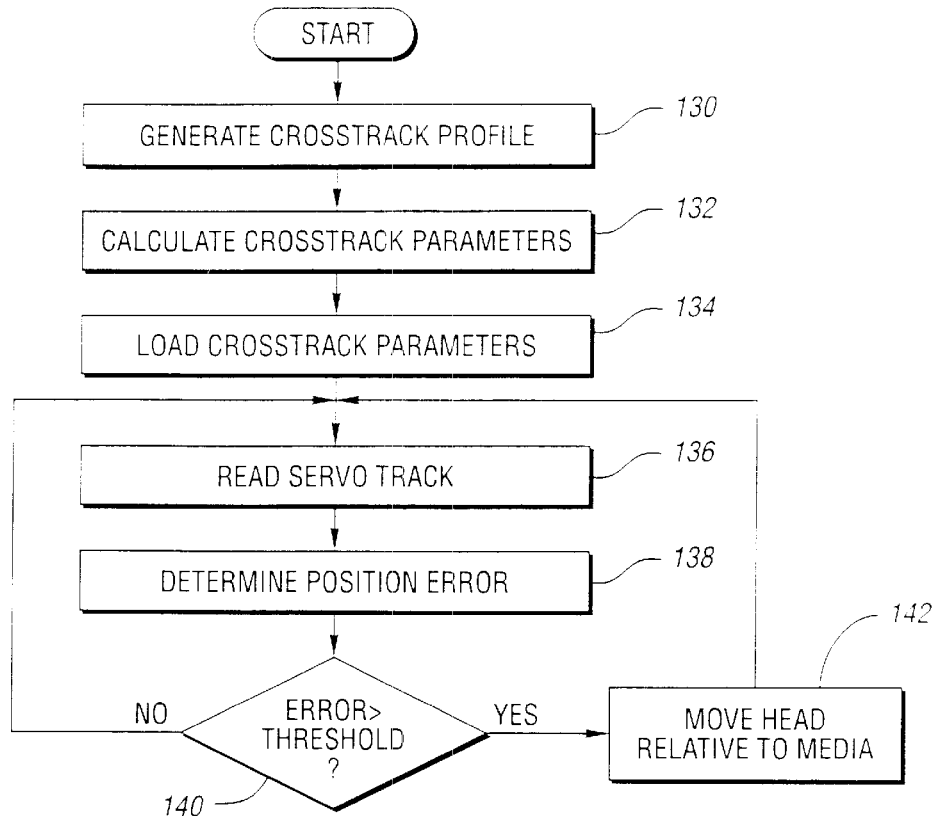
FIG. 7 is a flow diagram for a method of positioning a module according to an embodiment of the present invention.

Referring now to FIG. 7, a flow diagram for a method of positioning a module according to an embodiment of the present invention is shown. As will be appreciated by one of ordinary skill in the art, the operations illustrated in the flow diagram are not necessarily sequential operations. The order of steps may be modified within the spirit and scope of the present invention. Also, the method illustrated may be implemented by any combination of hardware, software, firmware, and the like. The present invention transcends any particular implementation and the embodiment is shown in sequential flow chart form for ease of illustration.

A crosstrack profile is generated in block 130. Crosstrack profile 100 may be generated by a variety of means. First, crosstrack profile 100 may be determined from measurements taken while servo read head 48 accesses one or more fields 70, 72 or a recorded test pattern. Second, crosstrack profile 100 may be derived from simulations of servo read head 48 and servo track 30. Third, crosstrack profile 100 can be estimated from the assumed shapes of servo read head track profile 90 and servo write track profile 92.

Crosstrack parameters are calculated in block 132. Crosstrack profile 100 provides a mapping of read signal 52 into position error 78. This mapping can be expressed using a fixed number of parameters to capture the shape of crosstrack profile 100. Each servo read head 48 is measured and the resulting measurements analyzed to extract parameters representing crosstrack profile 100 for the particular servo read head 48. Measurements of servo read head 48 may include obtaining read signals 52 from test fields 70, 72, taking physical measurements of servo read head 48, taking indirect measurements of servo read head 48, and the like.

Crosstrack parameters are loaded in block 134. Parameters used to map read signal 52 to position error 78 based on crosstrack profile 100 are written into memory 54 for use by head control 50.

Blocks 136, 138, 140, 142 represent a control loop for positioning tape 24 relative to access head assembly 22. At least one servo track is read in block 136. Servo read head 48 generates read signals 52 based on fields 70, 72 written onto servo track 30. The position error is determined in block 138. Position error 78 is calculated in head control 50 based on read signal 52 and coefficient for crosstrack profile 100 stored in memory 54. This calculation results in an indication of the distance servo read head 48 is located from the center of servo track 30, such as the difference between servo pattern centerline 74 and servo read head centerline 76. A check is made to determine if the position error is greater than a threshold in block 140. If position error 78 is not greater than a threshold, access head assembly 22 is not moved relative to tape 24. If position error 78 is greater than a threshold, head position servo 26 is commanded to move access head assembly 22 in a direction that minimizes position error 78.

Figure 8:
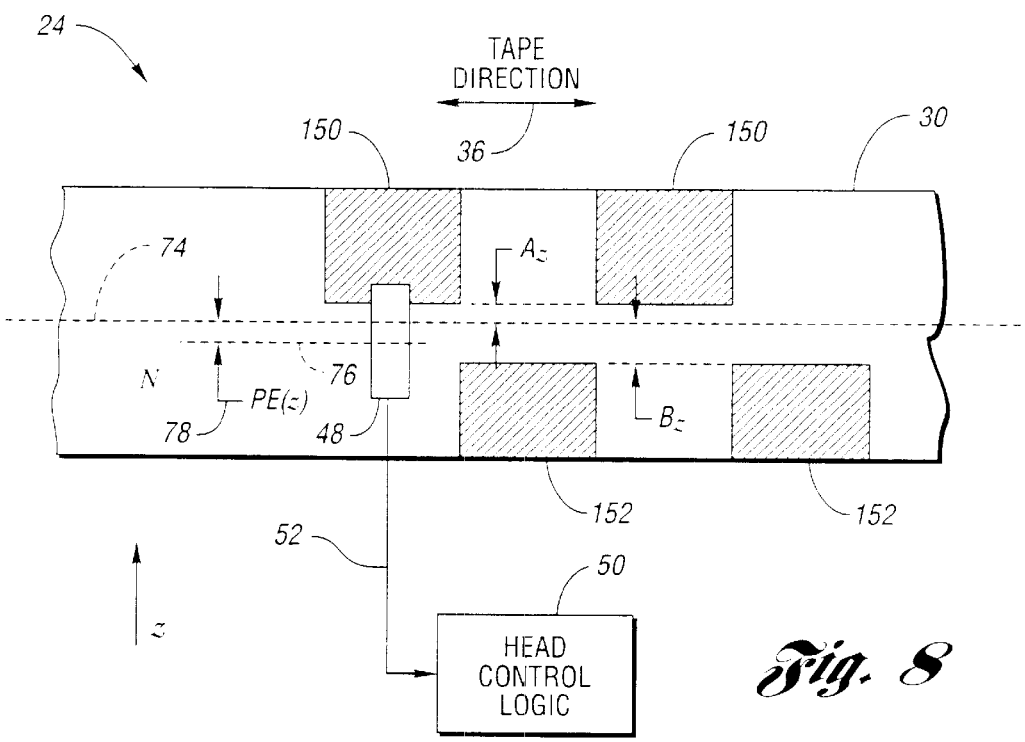
FIG. 8 is a block diagram illustrating position and servo track pattern errors that may be compensated by an embodiment of the present invention.

Referring now to FIG. 8, a block diagram illustrating position and servo track pattern errors that may be compensated by an embodiment of the present invention is shown. A first type of error results from inaccuracies in writing servo tracking pattern 34. For example, erase fields 72 may be written as A-bursts 150 alternated along the length of servo track 30 with B-bursts 152. A-bursts 150 may be written off servo pattern centerline 74 a distance $A_z$. B-burst fields 152 may be written off servo pattern centerline 74 a distance $B_z$. An expression for position error 78 can then be written as Equation 8:

$$PE(z) = \frac{w_t}{2} \frac{S\left(z - A_z - \frac{w_t}{2}\right) - S\left(z - B_z + \frac{w_t}{2}\right)}{S\left(z - A_z - \frac{w_t}{2}\right) + S\left(z - B_z + \frac{w_t}{2}\right)} \quad (8)$$

A second measure of servo error results in a misalignment of heads 42, 46, 48. For example, if data write head 42 and data read head 46 are manufactured such that one or both are not centered on data track axis 44 when servo read head 48 is centered on servo track 30, a tracking error may occur even though servo read head 48 is properly aligned on tape 24. A more general expression for position error 78 taking into account various types of errors is provided by Equation 9:

$$PE(z) = w \frac{S(z - z_0 - w) - S(z - z_0 + w)}{S(z - z_0 - w) + S(z - z_0 + w)} \quad (9)$$

where w is a constant based on the width of one or both of fields 70, 72 and $z_0$ is a measure of servo error.

While embodiments of the invention have been illustrated and described, it is not intended that these embodiments illustrate and describe all possible forms of the invention. For example, the best mode is described generally with regards to a magnetic tape deck. However, the present invention applies to a variety of media types including magnetic disks, optical tape, optical disks, and the like. Further, while a trapezoidal read track profile was disclosed in detail, any other shape for the servo read head track profile and the servo write track profile may be used. The words of the specification are words of description rather than limitation, and it is understood that various changes may be made without departing from the spirit and scope of the invention.

What is claimed is:

1. A method of positioning a module having at least one servo read head across media having at least one servo track, the method comprising:

determining a track profile of the servo read head;

determining a position error expression representative of the track profile based on the track profile;

generating a servo track signal by reading a servo track with the servo read head;

determining a tracking error based on the servo track signal and the position error expression; and positioning the module to correct the tracking error.

2. A method of positioning a module as in claim 1 wherein the track profile is determined from measurements of the servo read head after the module is constructed.

3. A method of positioning a module as in claim 1 wherein the position error expression is determined by assuming the servo read head track profile is trapezoidal.

4. A method of positioning a module as in claim 1 wherein the servo track comprises a checkerboard pattern with a background written at a first frequency and erase fields written at a second frequency.

5. A method of positioning a module as in claim 1 wherein the position error expression, PE(z), is expressed as $$PE(z) = w\frac{S(z - z_0 - w) - S(z - z_0 + w)}{S(z - z_0 - w) + S(z - z_0 + w)}$$

where S(z) is a crosstrack profile based on the servo read head track profile, w is a constant based on the width of the servo track pattern, and $z_0$ is a measure of servo error.

6. A method of positioning a module as in claim 5 wherein the measure of servo error comprises error in the servo track pattern.

7. A method of positioning a module as in claim 5 wherein the measure of servo error comprises error in head alignment.

8. A method of positioning a module as in claim 5 wherein the crosstrack profile is found by convolving the servo read head track profile with a servo track write profile.

9. A method of determining the position of an access module relative to a servo track read by a servo read head on the module, the servo read head generating a read signal based on a portion of a track pattern covered by the servo read head, wherein the module position is determined based on a model of a crosstrack profile formed by varying overlap of a track profile for the servo read head and a track profile for the track pattern.

10. A method of determining the position of an access module relative to a servo track as in claim 9 wherein the model of the crosstrack profile is a phenomenological model.

11. A method of determining the position of an access module relative to a servo track as in claim 10 wherein the phenomenological model of the crosstrack profile is the convolution of the servo read head track profile and the track pattern track profile.

12. A method of determining the position of an access module relative to a servo track as in claim 9 wherein the servo read head track profile is substantially trapezoidal.

13. A method of determining the position of an access module relative to a servo track as in claim 9 wherein the position is based on a position error expression, PE(z), expressed as $$PE(z) = w\frac{S(z - z_0 - w) - S(z - z_0 + w)}{S(z - z_0 - w) + S(z - z_0 + w)}$$

where S(z) is the crosstrack profile, w is a constant based on the width of the servo track pattern, and $Z_0$ is a measure of servo error.

14. A method of determining the position of an access module relative to a servo track as in claim 13 wherein the measure of servo error comprises error in the servo track pattern.

15. A method of determining the position of an access module relative to a servo track as in claim 13 wherein the measure of servo error comprises error in head alignment.

16. A method of determining the position of an access module relative to a servo track as in claim 9 wherein the servo track pattern comprises a checkerboard pattern with a background written at a first frequency and erase fields written at a second frequency.

17. A system for positioning an access module relative to data storage media having at least one servo track comprising:

a servo read head fixed to the access module, the servo read head generating a read signal in response to patterns in a read servo track;

a module positioning servo for positioning the module relative to the media based on a module control signal;

memory for holding coefficients mapping the read signal to position error based on a crosstrack profile, the crosstrack profile based on a track profile for the servo read head; and control logic in communication with the servo read head, the module positioning servo and the memory, the control logic operative to (a) receive the read signal, (b) calculate a position error based on the received read signal and the coefficients, and (c) generate the module control signal to reduce the position error.

18. A system for positioning an access module as in claim 17 wherein the read head track profile is substantially trapezoidal.

19. A system for positioning an access module as in claim 17 wherein the coefficients are determined from read signal measurements taken after the module is manufactured.

20. A system for positioning an access module as in claim 17 wherein the servo track comprises a checkerboard pattern with a background written at a first frequency and erase fields written at a second frequency.

21. A system for positioning an access module as in claim 17 wherein the position is based on a position error expression, PE(z), expressed as $$PE(z) = w\frac{S(z - z_0 - w) - S(z - z_0 + w)}{S(z - z_0 - w) + S(z - z_0 + w)}$$

where S(z) is the crosstrack profile, w is a constant based on the width of the servo track pattern, and $z_0$ is a measure of servo error.

22. A system for positioning an access module as in claim 21 wherein the measure of servo error comprises error in the servo track pattern.

23. A system for positioning an access module as in claim 21 wherein the measure of servo error comprises error in head alignment.

24. A system for positioning an access module as in claim 17 wherein the crosstrack profile is found by convolving the read head track profile with a track profile for a servo write pattern.

25. A system for positioning an access module as in claim 17 wherein the crosstrack profile is based on a phenomenological model of the servo read head.

* * * * *